United States Patent
Prieur

(10) Patent No.: US 9,567,787 B2
(45) Date of Patent: Feb. 14, 2017

(54) DOOR STOP DEVICE

(71) Applicant: Andre Prieur, La Garenne Colombes (FR)

(72) Inventor: Andre Prieur, La Garenne Colombes (FR)

(*) Notice: Subject to any disclaimer, the term of this patent is extended or adjusted under 35 U.S.C. 154(b) by 372 days.

(21) Appl. No.: 14/350,876

(22) PCT Filed: Oct. 1, 2012

(86) PCT No.: PCT/EP2012/004117
§ 371 (c)(1),
(2) Date: Apr. 10, 2014

(87) PCT Pub. No.: WO2013/053444
PCT Pub. Date: Apr. 18, 2013

(65) Prior Publication Data
US 2015/0292251 A1    Oct. 15, 2015

(30) Foreign Application Priority Data
Oct. 11, 2011 (FR) .................... 11 03088

(51) Int. Cl.
*E05F 5/08* (2006.01)
*E05C 17/20* (2006.01)
*B60J 5/00* (2006.01)

(52) U.S. Cl.
CPC .. *E05F 5/08* (2013.01); *B60J 5/00* (2013.01); *E05C 17/203* (2013.01); *Y10T 16/615* (2015.01)

(58) Field of Classification Search
CPC .................. E05F 5/06; E05F 5/08; B60J 5/00; E05C 17/203; E05C 17/206; Y10T 16/615; Y10T 16/61; Y10T 16/625; Y10T 16/27; Y10T 16/54028

(Continued)

(56) References Cited

U.S. PATENT DOCUMENTS 2,290,331 A * 7/1942 Jacobs .............. E05C 17/206
16/331
4,833,755 A * 5/1989 Bonin .............. E05C 17/206
16/344

(Continued)

FOREIGN PATENT DOCUMENTS

| EP | 0952289 A1 | 10/1999 |
| FR | 2874051 A1 | 2/2006 |
| FR | 2889234 A1 | 2/2007 |

OTHER PUBLICATIONS

International Search Report, dated Nov. 13, 2012, from corresponding PCT application.

*Primary Examiner* — William Miller
(74) *Attorney, Agent, or Firm* — Young & Thompson

(57) ABSTRACT

A door stop device, includes a blocking mechanism (2) and a guiding arm (1), one of these being fastened to the opening part of the door, the other being fastened to the frame, the blocking mechanism (2) including a braking element (24) pressed against a braking roller (21) which is kept in contact with the guiding arm (1), the axle (22) of the braking roller (21) being allowed to move relatively to the body of blocking mechanism (2) within specified limits, the blocking mechanism (2) also including elastic elements (26) defined to bring braking roller (21) and braking element (24), back in compression against each other. A mobile interface unit (25), allows to modulate the load generated by the elastic elements (26), increasing the load when braking roller (21) is in locked position and decreasing the load when braking roller (21) rotates freely.

10 Claims, 9 Drawing Sheets

Figure 1:
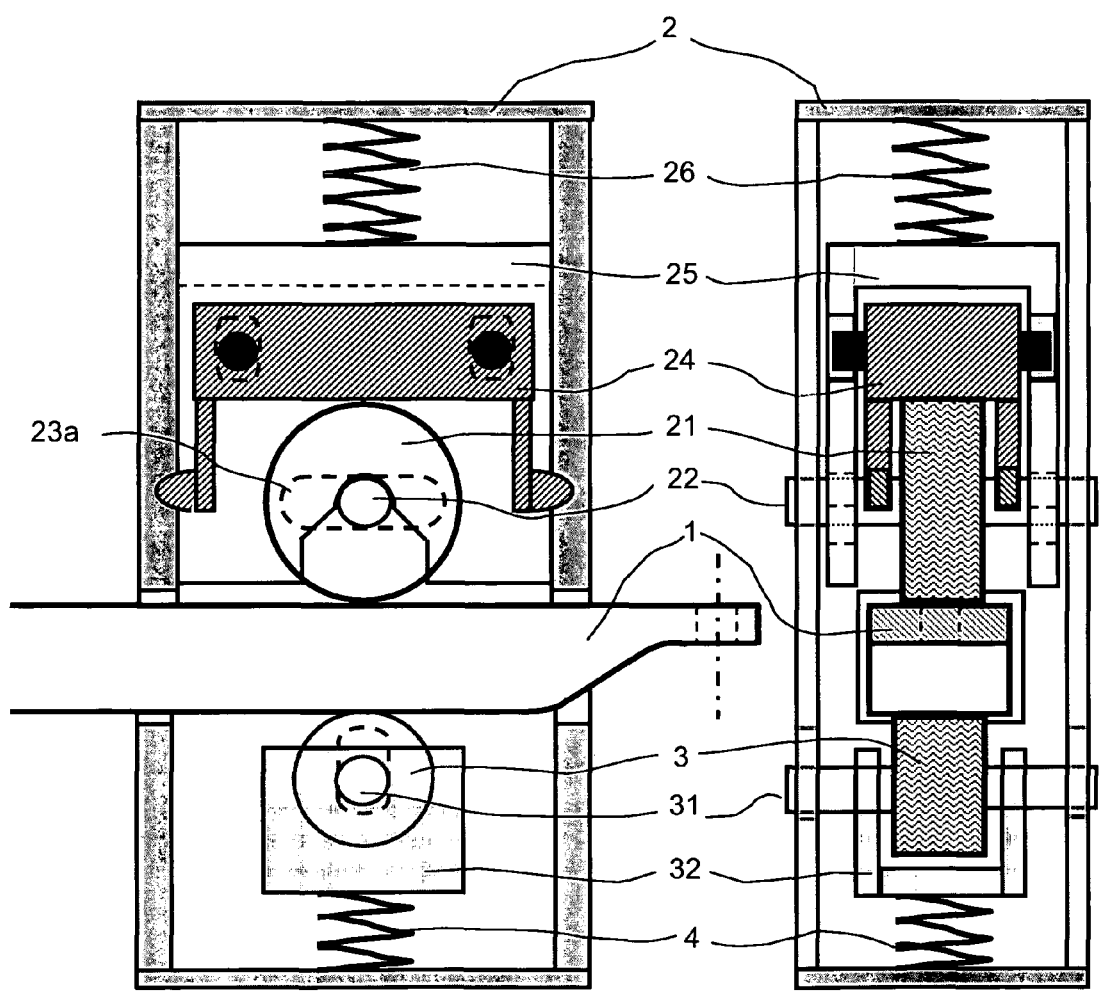

(58) Field of Classification Search
USPC ... 16/83, 82, 85, 49, 334; 292/DIG. 19, 275, 292/262; 296/146.9, 146.11
See application file for complete search history.

(56) References Cited

U.S. PATENT DOCUMENTS

| | | | | |
|---|---|---|---|---|
| 5,152,030 | A * | 10/1992 | Cogo | E05C 17/206 |
| | | | | 16/344 |
| 5,474,344 | A * | 12/1995 | Lee | E05C 17/203 |
| | | | | 16/86 C |
| 5,727,287 | A * | 3/1998 | Hosken | E05C 17/203 |
| | | | | 16/334 |
| 6,370,732 | B1 | 4/2002 | Yezersky et al. | |
| 6,467,126 | B1 * | 10/2002 | Yezersky | E05C 17/203 |
| | | | | 16/86 B |
| 6,513,193 | B1 * | 2/2003 | Yezersky | E05C 17/203 |
| | | | | 16/86 A |
| 6,901,630 | B2 * | 6/2005 | Liang | E05C 17/203 |
| | | | | 16/82 |
| 7,578,029 | B2 | 8/2009 | Prieur | |
| 7,793,387 | B2 * | 9/2010 | Clark | E05C 17/203 |
| | | | | 16/82 |
| 7,832,051 | B2 | 11/2010 | Prieur | |
| 2004/0251696 | A1 * | 12/2004 | Murayama | E05C 17/203 |
| | | | | 292/262 |
| 2008/0066259 | A1 * | 3/2008 | Prieur | E05C 17/203 |
| | | | | 16/85 |

\* cited by examiner

DOOR STOP DEVICE

BACKGROUND OF THE INVENTION

The present invention relates to a door stop device, comprising a blocking mechanism and a guiding arm, one of these two elements being fastened to the opening part of the door, the other element being fastened to the frame of the door, the said blocking mechanism including at least one braking element pressed against at least one braking roller which is kept in contact with the guiding arm, the axle of the said braking roller being allowed to move relatively to the body of the blocking mechanism, within specified limits, the said blocking mechanism also comprising elastic means designed to bring back the said braking roller and braking element in a position where they are pressed against each other, allowing in this way to hold the door open in any stable position.

The invention is within the door stop area with applications more specifically in the area of motor vehicles, buildings of any kind and household appliances.

DESCRIPTION OF THE RELATED ART

Some door stop mechanisms are known as the one described in document FR 2 889 234, related to a door stop mechanism providing a possibility to hold a swinging or sliding door in any indeterminate retaining position, between closed and fully open, as soon as the required opening or closing force has ceased, with possible applications to automobile doors.

The door stop mechanism described in document FR 2 889 234 comprises specifically:

An articulated guiding arm, formed by a metallic rod or any other resistant material, providing tracks on two opposite faces.

A mechanism comprising blocking means for the guiding arm, the release of these blocking means being triggered by an effort applied to the said mechanism in a direction nearly parallel to the guiding arm.

More specifically, the mechanism comprises a carriage device which holds a braking roller rotating on its axle, the said braking roller being mounted in a way to allow a limited displacement relatively to the carriage device, in a perpendicular direction to the axis of the roller. The said braking roller, according to one of the ways the assembly is configured, may be blocked by a braking element and may be released with free rotation when the braking roller and the braking element are set apart. Elastic means reacting on the axle of the braking roller will pull the braking roller back in its blocked position.

The said mechanism also comprises an opposite roller rotating and assembled to a bracket designed accordingly. The guiding arm is held between this opposite roller and the braking roller.

The braking roller is specifically designed and produced with materials adapted to its functionality. In addition, the guiding arm may be featured with notches or bosses located on the said tracks of the guiding arm, in order to improve the hold of the braking roller, which itself will be designed in a material providing high friction characteristics.

However, this door stop mechanism is known to allow only a limited blocking force, due to the elastic means which are intended to provide both the hold force and the force needed to pull the braking roller back to the locked position, in contact with the braking element. Therefore, the ratio between the blocking force related to the locked mode and the drag force needed to keep the braking roller in free rotation during the unlock phase, is limited. In fact, with the mechanism described hereabove, the free rotation of the braking roller, needed to allow the door maneuvers, requires some friction forces or forces resulting from plastic deformation to compensate the effort provided by the elastic means, in order to balance the opposite forces and prevent the mechanism to re-lock instantaneously under the action of the elastic means. The said friction forces or forces resulting from plastic deformation are intendedly limited to avoid too much resistance when opening and closing the door. This implies a limitation to the force provided by the elastic means and therefore a limitation to the blocking force.

SUMMARY OF THE INVENTION

The present invention proposes a solution to overcome this problem by improving this door stop mechanism, through the addition of a mobile interface unit, allowing to monitor the force provided by the elastic means, in relation to the braking roller's position, locked on the one hand, or in free rotation on the other hand, making it possible to have a big blocking force in the locked mode and a relatively low drag force in the un-locked mode.

In this regard, the invention is related to a door stop device, comprising a blocking mechanism and a guiding arm, one of these two elements being fastened to the opening part of the door, the other element being fastened to the frame of the door, the said blocking mechanism including at least one braking element pressed against at least one braking roller which is kept in contact with the guiding arm, the axle of the said braking roller being allowed to move relatively to the body of the blocking mechanism, within specified limits, in a direction globally parallel to the guiding arm, the said blocking mechanism also comprising elastic means designed to bring back the said braking roller and braking element in a position where they are pressed against each other, remarkable by the fact that:

the said braking roller is mounted on the blocking mechanism in a way to allow a limited displacement of its axle in a direction parallel to the guiding arm; this configuration allows the braking roller to be released from the braking element, whenever a force sufficient to move the braking roller is applied to the guide. The door stop device is then in un-locked mode.

a mobile interface unit, mounted on the blocking mechanism and which is allowed to move in a direction globally perpendicular to the guiding arm, comprises bearing means to transfer the efforts produced by the elastic means to the axle of the braking roller. The said bearing means to transfer the efforts from the mobile interface unit may be constituted by notches or bossings, the shape of which comprise ramps with variable slopes, directly or indirectly in contact with the axle of the braking roller. It is easy to verify that according to the slope of the said ramps, the resulting force applied to the axle of the braking roller, in a direction parallel to the guiding arm, will be larger or smaller when the said axle moves along the said ramps. As explained hereunder, it will be advantageous to use a ramp with a steady slope when the braking roller is in its blocked position, in contact with the braking element. The door stop device is then in the locked mode. At the opposite, it will be advantageous to use a ramp with a limited slope, when the braking roller is rotating along the guide, no longer in contact with the braking element. The door stop device is then in the un-locked mode.

the elastic means cooperate with the mobile interface unit described hereabove in a globally perpendicular direction relatively to the guiding arm. The said mobile interface unit cooperates with the axle of the braking roller in a perpendicular direction relatively to the said axle, but with a variable slope. Therefore, when a sufficient operating load appears on the guiding arm and is transferred through the braking roller, the axle of the braking roller moves in a direction parallel to the guiding arm, and escapes from the notches comprised on the mobile interface unit, to reach the ramps with variable slopes. In the meantime, the mobile interface unit moves in a direction globally perpendicular to the displacement of the braking roller's axle, and generates a compression force on the elastic means. This pattern allows the mobile interface unit to operate on the axle of the braking roller, by transferring the force provided by the compression of the elastic means through a variable slope, and consequently with a variable resulting force in a direction parallel to the guiding arm. As a consequence, the load seen by the axle of the braking roller in a direction parallel to the guiding arm, may be made relatively large, when the braking roller is in its blocked position, door stop device in the locked mode, and at the opposite, the said load seen by the axle of the braking roller in a direction parallel to the guiding arm, may be made relatively small, when the braking roller is in free rotation, without any contact with the braking element, the door stop device being then in the unlocked mode. The elastic means, directly or indirectly linked to the blocking mechanism, may be produced out of a metallic or plastic assembly, or a blend of those materials, for example an assembly comprising a helicoidal spring or elastic blades, or even a deformable element, as a part made of elastomer material.

the braking element which cooperates with the braking roller is itself mounted on the blocking mechanism, and is allowed to move in a direction globally perpendicular to the guiding arm, in a way that the braking element can be set apart from the braking roller, in order to release the said braking roller. The invention sets that the braking element may be displaced by the operation of the mobile interface unit, through a mechanical link providing a connection between the braking element and the mobile interface unit, when the said mobile interface unit moves. As a non restrictive example, this mechanical link may be realized by some pins mounted on one of the elements and that cooperate with oblong slots provided in the second element. The invention also sets that the braking element may be submitted to the load of elastic means, intended to bring the said braking element back in the locked position, in contact with the braking roller. These elastic means, directly or indirectly linked to blocking mechanism, may be similar to the elastic means cooperating with the mobile interface unit and described hereunder in one assembly example.

It can be noticed that when the braking roller is released from the braking element, and that it rotates along the guiding arm, the door stop device being then in unlocked mode, the axle of the said braking roller is submitted to the load of the elastic means through the mobile interface unit, this load tending to bring the braking roller back to the locked position, in contact with the braking element. The stability in unlocked mode remains possible due to the balance between the forces converging on the axle of the braking roller. This balance is achieved through several forces opposed to the effect of the elastic means, the said elastic means operating on the axle of the braking roller through the mobile interface unit, the said several forces mainly generated by:

the friction between the braking roller and the body of the blocking mechanism. The said friction may be adjusted by adapting the clearance between the contact surfaces provided on the braking roller and on the blocking mechanism. Those contact surfaces designed on the braking roller may be located anywhere on the flanges or on the peripheral part of the said braking roller.

the friction between the braking roller and the guiding arm, due to the rotation of the said braking roller in contact with the guiding arm.

the forces due to the elastic deformation of the braking roller during its rotation along the guiding arm, when the said braking roller is made of elastic material, for example a material containing some elastomer.

Variation of Braking Roller:

In order to improve the operating stability of the door stop device in unlock mode, a variation of the braking roller is proposed, with a feature to increase the friction forces described hereabove. The feature is composed of at least one additional roller, so called friction roller, mounted beside the braking roller, on the same axle and without any contact with the guiding arm, and the said friction roller is designed with some rough surfaces that are in contact with the said braking roller. When the braking roller is displaced and starts rotating in the unlocked mode, the friction roller is intended to be blocked by entering into contact with a rough part of either the blocking mechanism or the mobile interface unit. This configuration ensures that a friction force appears between, on the one hand, the braking roller while it is rotating along the guiding arm, and on the other hand the friction roller which is blocked. The balance between the forces generated by the elastic means on the one hand, and the friction forces generated on the braking roller during unlocked phase on the other hand, is reinforced this way.

Variation of the Elastic Means:

The elastic means cooperate with the mobile interface unit in order to transfer the forces generated by the elastic means, to the axle of the braking roller. According to one of the realization modes for the elastic means, the invention proposes to modulate the load generated by the said elastic means, depending on the incline of the blocking mechanism, in order to modulate the hold force in locked mode, when the blocking mechanism is inclined. For this purpose, the invention proposes to design the elastic means by adding the effects of at least two distinct elastic means, arranged in a way to allow the forces generated by the said elastic means to become cumulative in the same direction, whenever a mechanical link is introduced between the said distinct elastic means, simply by the effect of gravity. The mechanical link operating simply by the effect of gravity may be advantageously formed by a spherical ball located in a cavity with inclined faces, the said cavity being placed on a part belonging to one of the distinct elastic means, the said part being located in front of another part belonging to the other elastic means, the said parts being allowed to come close to each other as long as the spherical ball remains located in its cavity. In this case, only one of the elastic means is being compressed when the mobile interface device is displaced, while the other elastic means is not displaced and therefore not compressed, because there is no mechanical link between the two distinct elastic means. On the contrary, when the spherical ball moves out of its cavity by the effect of gravity, due to an incline of the door stop device above a predefined threshold, then the said spherical ball rolls in between the said parts of the distinct elastic means, providing a mechanical link allowing the first elastic means to push the second elastic means, which gives an addition of the loads generated by each of the two distinct elastic means. Therefore, whenever the door stop device remains with an inclination below a predefined threshold, only one of the elastic means is activated by the displacement of the mobile interface unit, and the resulting load remains moderate. On the opposite, when the inclination of the door stop device goes beyond a predefined threshold, the two elastic means will be activated simultaneously by the displacement of the mobile interface device and the resulting load will be larger.

BRIEF DESCRIPTION OF THE DRAWING FIGURES

Other purposes and advantages of the present invention will appear in the description hereafter, which relates to a realization mode of the device proposed by the invention, to be considered as a non limitative example and the understanding of which can be made easier by referring to the drawings enclosed:

FIG. 1: schematic drawing of the door stop device, improved by the addition of a mobile interface unit (25) operating on the axle (22) of the blocking roller (21).

Figure 2:
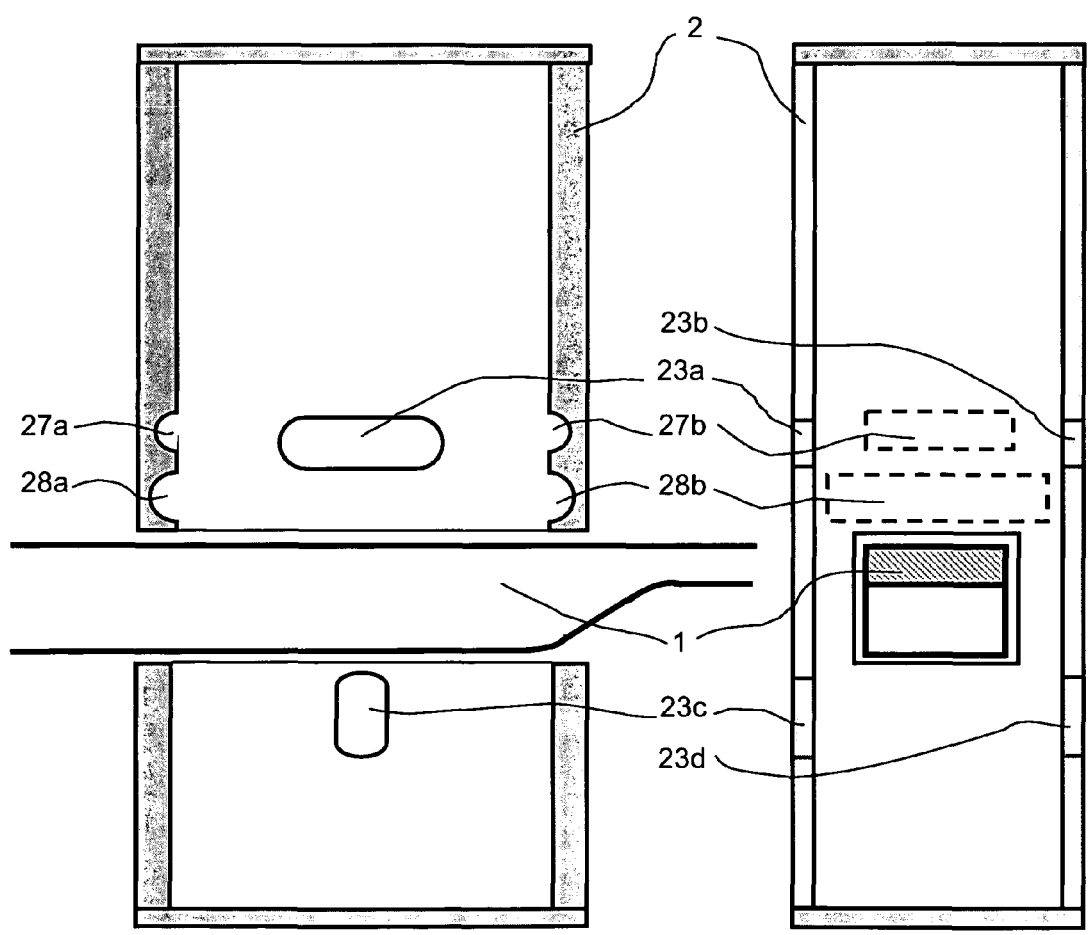

FIG. 2: schematic drawing of the body of blocking mechanism (2).

Figure 3:
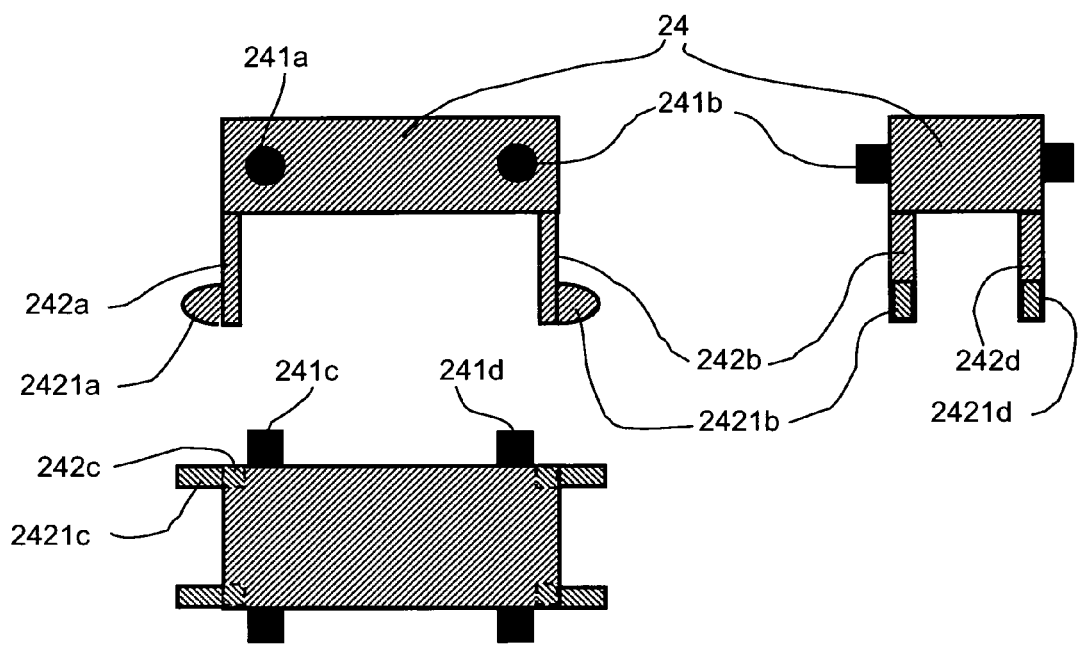

FIG. 3: schematic drawing of braking element (24).

Figure 4:
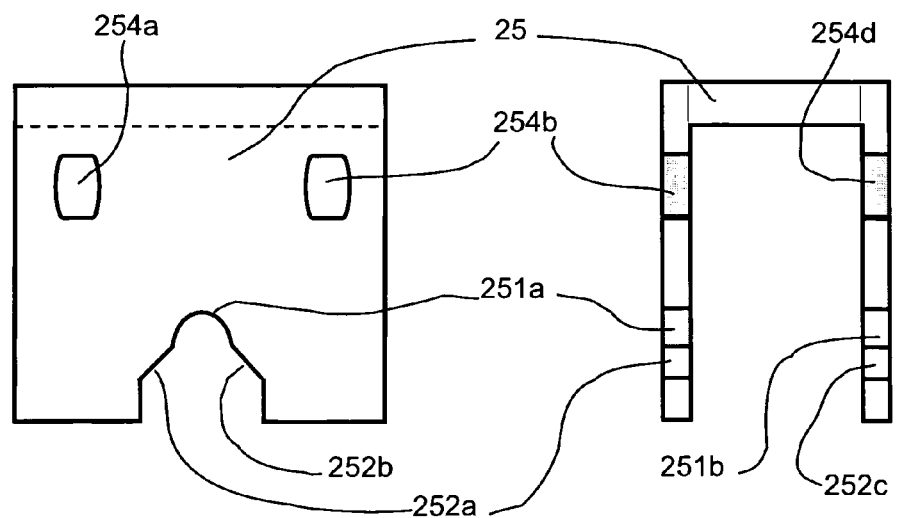

FIG. 4: schematic drawing of mobile interface unit (25), front and side views.

Figure 5:
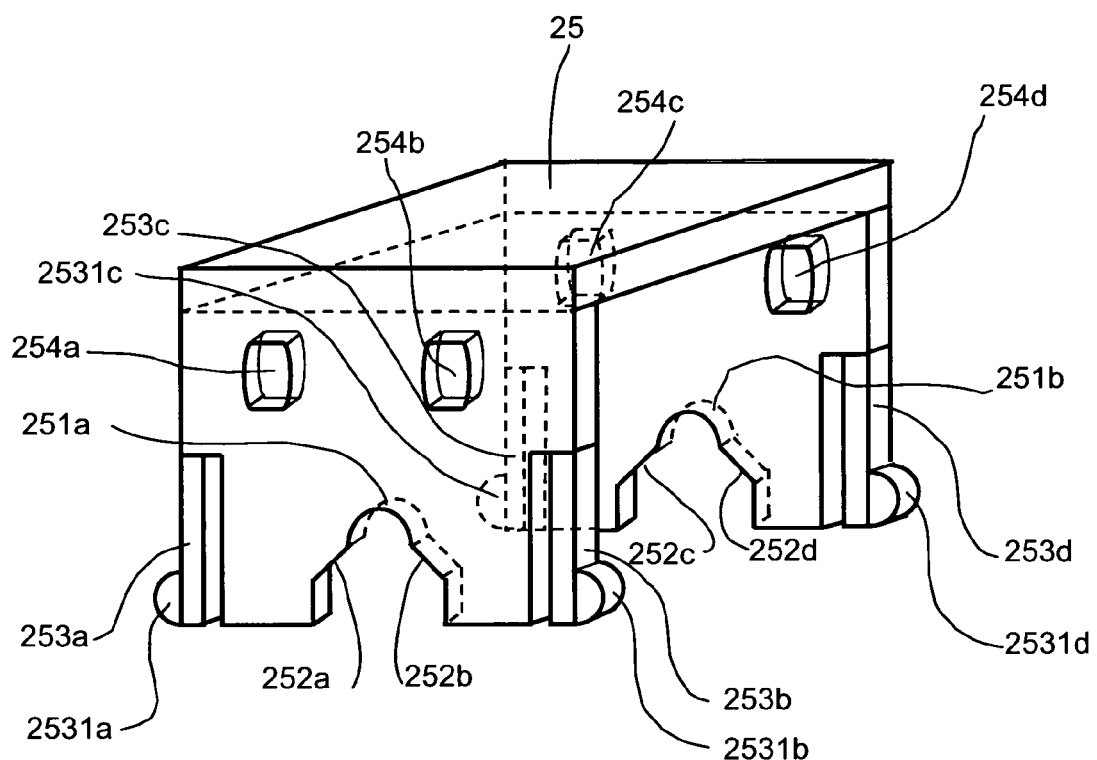

FIG. 5: schematic drawing of mobile interface unit (25), in a variation where elastic means (26) are replaced by elastic blades (253a), (253b), (253c) and (253d).

Figure 6:
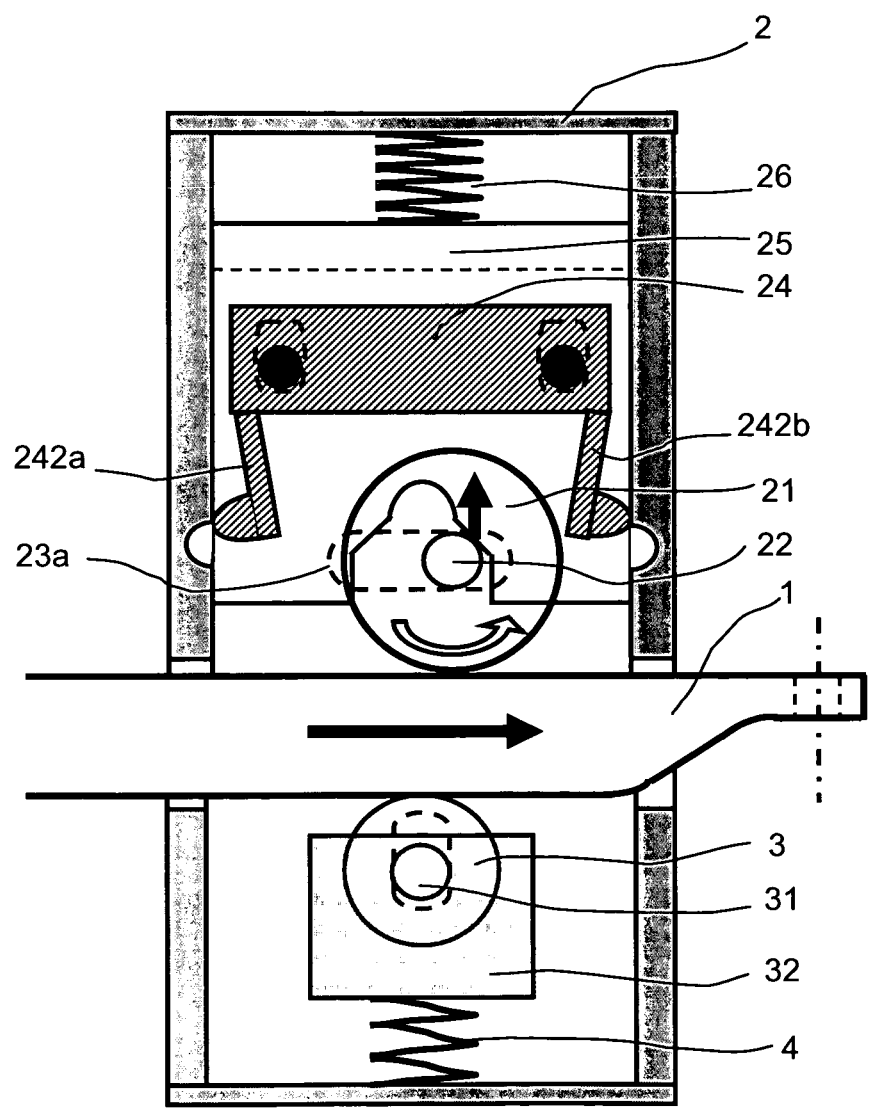

FIG. 6: schematic drawing of door stop device represented in unlocked mode.

Figure 7:
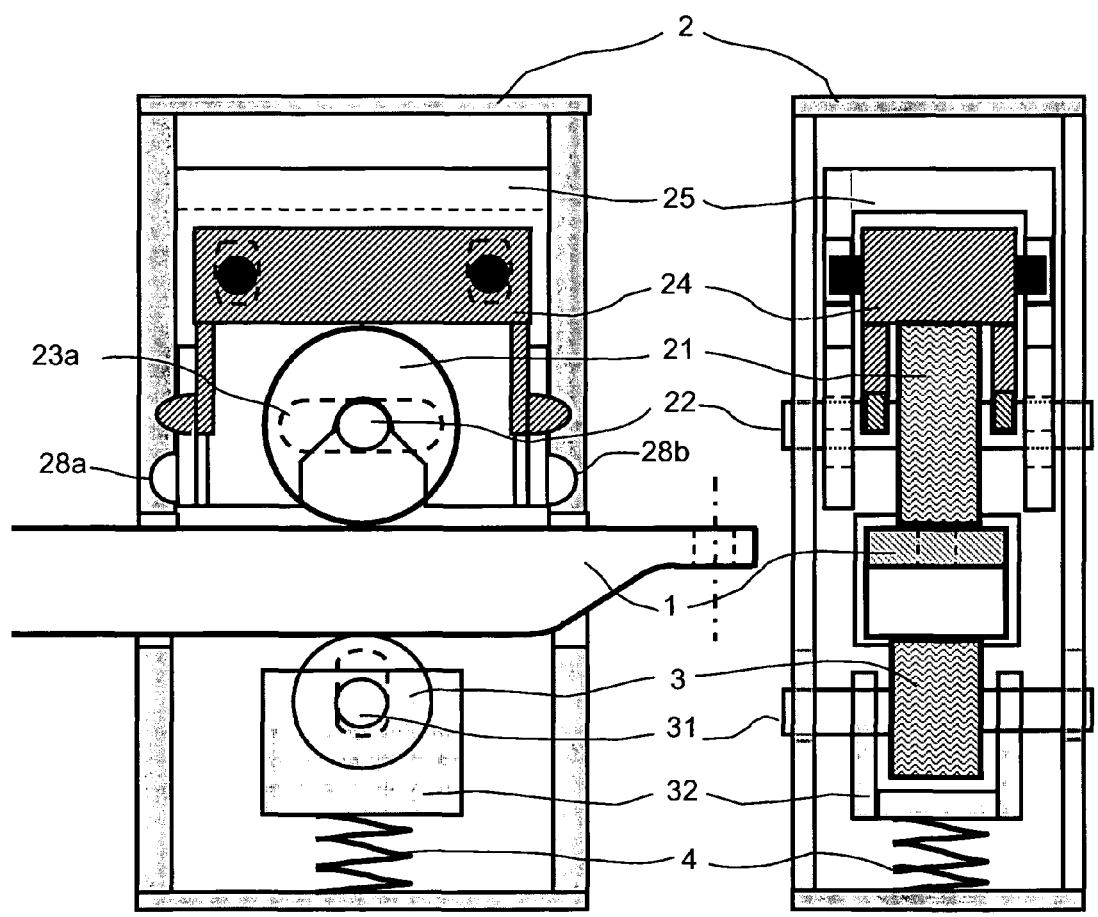

FIG. 7: schematic drawing of door stop device in a variation where elastic means (26) are replaced by elastic blades (253a), (253b), (253c) and (253d).

Figure 8:
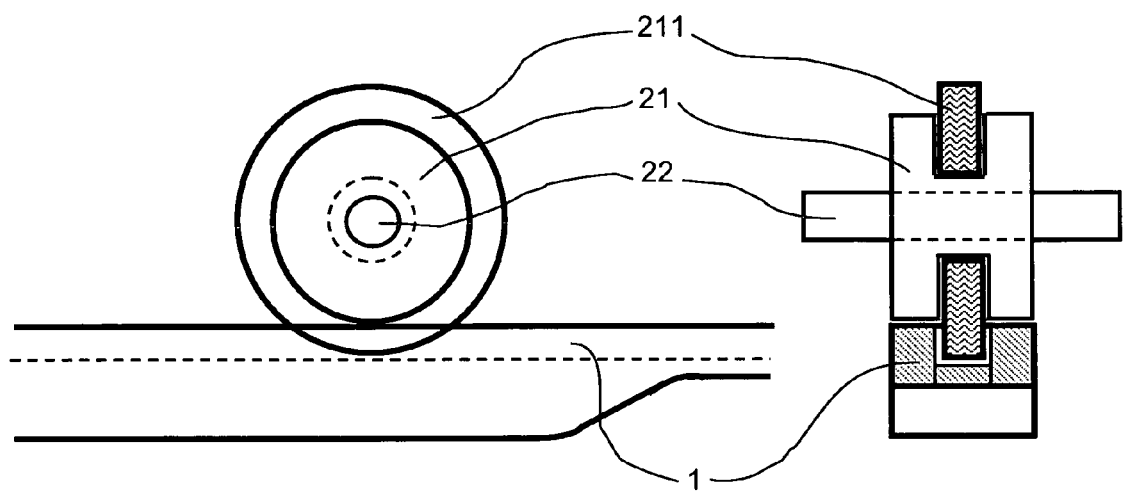

FIG. 8: schematic drawing of a variation of braking roller (21) when a friction roller (211) is added.

Figure 9:
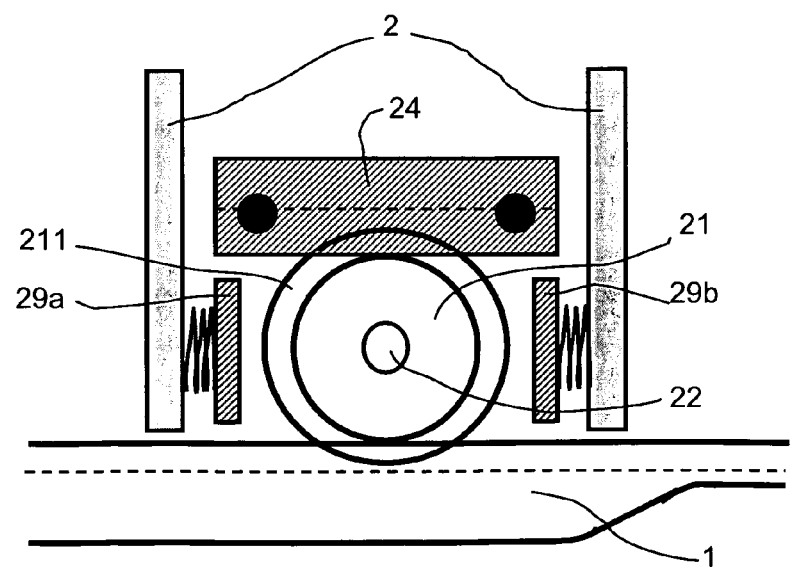

FIG. 9: schematic drawing of pads (29a) and (29b), intended to block friction roller (211).

Figure 10:
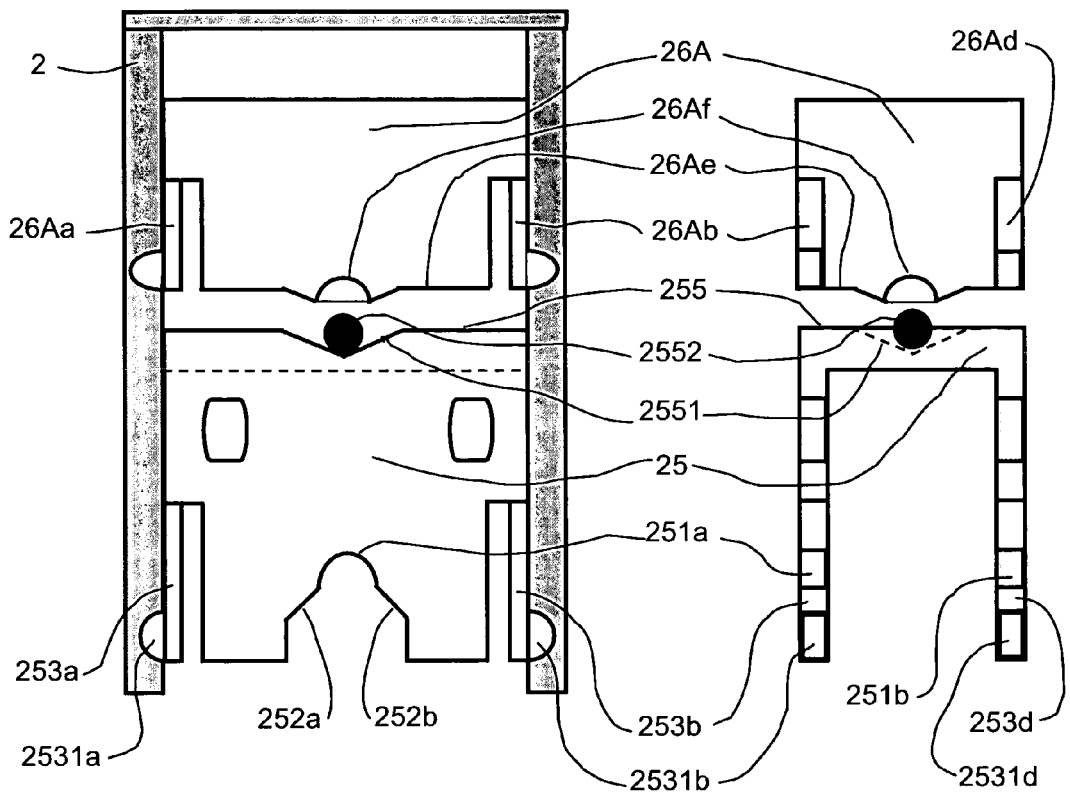

FIG. 10: schematic drawing of a variation of elastic means (253a), (253b), (253c) and (253d), in the case an additional elastic means, block (26A), is added in order to increase the load when the door stop unit is inclined.

Figure 11:
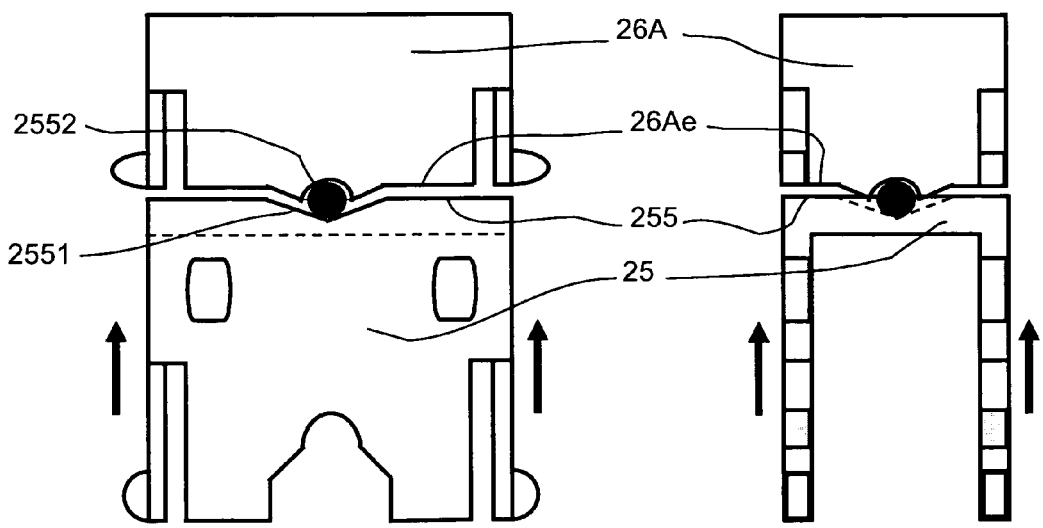

FIG. 11: schematic drawing of variation described on FIG. 10, in the case the door stop device is not inclined, with the spherical ball (2552) remaining inside its cavity (2551).

Figure 12:
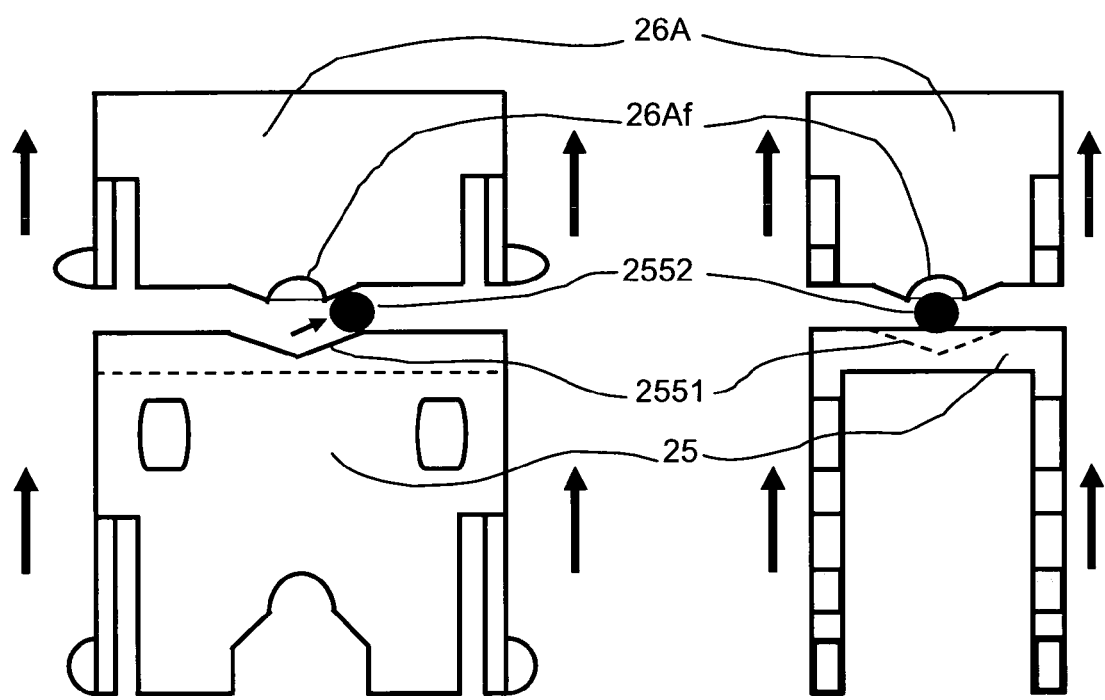

FIG. 12: schematic drawing of variation described on FIG. 10, in the case the door stop device is inclined, with the spherical ball (2552) being outside of its cavity (2551).

DETAILED DESCRIPTION OF THE INVENTION

The example of realization mode for the door stop device proposed by the present invention is constituted by (FIG. 1):

A guiding arm (1), preferably articulated at one end, advantageously formed by a metallic rod or with other resistant material, providing at least one rolling track, preferably two, on opposite faces. This guiding arm may be fastened to the opening part of the door or to the frame of the door. Cross section of guiding arm (1) may be variable, in a way that the opposite faces providing rolling tracks are not necessarily kept parallel on their total length. In addition, notches or bosses may be defined on the rolling tracks of guided arm (1), in order to obtain some areas more or less easy to roll on.

A blocking mechanism (2), which is allowed a limited displacement relatively to guiding arm (1), the said blocking mechanism (2) being fastened to the opening part of the door or to the frame of the door, in order to cooperate with guiding arm (1) and provide the blocking function for guiding arm (1), in any position, as long as the door is not submitted to a load that would exceed the unlocking force.

The said blocking mechanism (2) comprises (FIG. 1):

A braking roller (21), mounted on its axle (22).

lateral guiding slots (23a) and (23b) (FIG. 2), along which axle (22) of braking roller (21) is free to move with a limited amplitude and in a parallel direction to guiding arm (1), the said lateral guiding slots (23a) and (23b) being possibly defined with notches and/or bosses that may alter the displacement of axle (22). In this way, braking roller (21) is mounted on blocking mechanism (2), free to move with a limited amplitude and in a parallel direction to guiding arm (1).

a braking element (24), (FIG. 3), which cooperates with braking roller (21), (FIG. 1), the said braking element (24) being itself mounted on blocking mechanism (2), and being allowed to move in a direction globally perpendicular to guiding arm (1), in a way that the said braking element (24) may be set apart from braking roller (21), in order to release said braking roller (21). It is then easy to understand that while braking element (24) is pressed against braking roller (21), the said braking element (24) prevents blocking roller (21) from rotating; the said blocking roller (21) being linked to blocking mechanism (2) and permanently in contact with guiding arm (1), this provides a relative locking between guiding arm (1) and blocking mechanism (2). The invention sets that braking element (24) may be activated by the displacement of mobile interface unit (25), described hereafter, (FIG. 4) and (FIG. 5), through the means of a mechanical link constituted here, as a non restrictive example, by pins (241a), (241b), (241c) and (241d) located on braking element (24) and facing oblong slots, respectively (254a), (254b), (254c) and (254d), located on mobile interface unit (25). It is then easy to understand that when mobile interface unit (25) is displaced relatively to blocking mechanism (2), due to the displacement of axle (22), which is then released from notches (251a) and (251b) described hereafter, the said mobile interface unit (25) pulls braking element (24) apart from braking roller (21), allowing the said braking roller (21) to rotate. The invention also sets that braking element (24), (FIG. 3), may be submitted to elastic means (242a), (242b), (242c) and (242d), intended to bring braking element (24) back to locked position, pressed against braking roller (21). In the proposed realization mode, the said elastic means (242a), (242b), (242c) and (242d) are constituted by elastic blades fastened to braking element (24), the said elastic blades comprising bosses (2421a), (2421b), (2421c) and (2421d) located at their extremity, the said bosses being located in front of notches (27a) and (27b) which are provided on the faces of the blocking mechanism (2), (FIG. 2).

a mobile interface unit (25), (FIG. 4), itself mounted on blocking mechanism (2) and allowed to move in a direction globally perpendicular to guiding arm (1), in a way that said mobile interface unit (25) may compress elastic means (26) described hereafter, when axle (22) of braking roller (21) is displaced along guiding slots (23*a*) and (23*b*), the said guiding slots being placed in the lateral faces of blocking mechanism (2). The said mobile interface unit (25) comprises, for this purpose, bearing means designed to transfer the efforts produced by the elastic means to the axle of the braking roller; the said bearing means are constituted by notches (251*a*) and (251*b*), and ramps with an incline (252*a*), (252*b*), (252*c*) and (252*d*), (FIGS. 4 and 5), in contact with axle (22) of braking roller (21). Then, when axle (22) of braking roller (21) slides along lateral guiding slots (23*a*) and (23*b*), (FIG. 6), in a direction parallel to guiding arm (1), said axle (22) is removed from notches (251*a*) and (251*b*) located on mobile interface unit (25), to reach respectively inclined ramps (252*a*) and (252*c*), or (252*b*) and (252*d*). The mobile interface unit (25) is then submitted to a displacement globally perpendicular to the displacement of axle (22), which allows said mobile interface unit (25) to compress elastic means (26). In this way, axle (22) of braking roller (21) is submitted to forces generated by elastic means (26), the said forces being transmitted by mobile interface unit (25).

Elastic means (26), (FIG. 1), linked to blocking mechanism (2) are drawn schematically as a coil spring, for example. Then, the mobile interface unit (25), being pressed by elastic means (26), tends to retain axle (22) of roller (21) in the notches (251*a*) and (251*b*), the hold force depending on the load generated by elastic means (26), but also depending on the depth as well as on the incline of the ramps of said notches (251*a*) and (251*b*). It is easy to understand that the deeper notches (251*a*) and (251*b*) will be, the bigger the force to release axle (22), which allows to define the hold force provided by the door stop device. In addition, as soon as axle (22) has been released from notches (251*a*) et (251*b*), due to a sufficient load applied on guiding arm (1), braking roller (21) is then released from braking element (24), the said braking element (24) being set apart from braking roller (21) due to the displacement of mobile interface unit (25), said axle (22) being submitted to the pressure of inclined ramps (252*a*), (252*c*) or (252*b*), (252*d*) (FIG. 6), the said ramps transferring the forces generated by elastic means (26) with a bigger or smaller incline relative to the direction of guiding arm (1). Then, when the incline of ramps (252*a*), (252*c*) or (252*b*), (252*d*) is small relative to guiding arm (1), the resulting force applied to axle (22) in a direction parallel to guiding arm (1) will remain limited, although at the same time, elastic means (26) provide a relatively big force, due to the compression of said elastic means (26). In this way, it is possible to balance the forces between, on the one hand, the resulting load coming from elastic means (26) which are transferred by mobile interface unit (25) in a direction parallel to guiding arm (1), and which tend to bring axle (22) back into the locked position, inside notches (251*a*) and (251*b*), and on the other hand, the friction forces due to the rotation of braking roller (21) along guiding arm (1), the said friction forces being intentionally of a limited amplitude. Then, when the movement of the door during opening or closing maneuvers is interrupted, the said friction forces due to the rotation also disappear, and axle (22) being only submitted to the load of elastic means (26), the said load being transferred by inclined ramps (252*a*), (252*c*) or (252*b*), (252*d*) (FIG. 6), the said axle (22) is then brought back into the locked position, inside notches (251*a*) and (251*b*). The door stop unit is then in locked position.

In a preferred realization mode, a variation of elastic means (26) may be constituted by elastic blades (253*a*), (253*b*), (253*c*) and (253*d*), linked to mobile interface unit (25) and comprising bosses (2531*a*), (2531*b*), (2531*c*) and (2531*d*) located at their free extremity, the said bosses being located in front of notches (28*a*) and (28*b*) which are located on the faces of blocking mechanism (2), (FIGS. 5 and 7). The advantage of this solution is a volume reduction compared to a solution using a coil spring.

The door stop device proposed by this invention may comprise at least one roller (3), intended to counterbalance the load generated by braking roller (21) on guiding arm (1). The said roller (3) may be mounted with free rotation on an axle (31), which is itself directly linked to blocking mechanism (2) or indirectly through a bracket (32). (FIG. 1). In addition, axle (31) of roller (3) may be guided by oblong slots (23*c*) and (23*d*) provided in the lateral faces of blocking mechanism (2). (FIG. 2). In addition, the said roller (3) may be submitted to elastic means (4), drawn schematically as a coil spring, the load being transferred directly or through bracket (32). It is easy to understand that the use of roller (3) allows to balance the load generated by roller (21) on guiding arm (1). In addition, notches or bosses may be provided on the side of guiding arm (1) which is in contact with roller (3), in order to potentially form some zones with more or less rolling resistance, as it may be defined on existing state of the art door stop systems.

Variation of braking roller (21) (FIGS. 8 and 9): it is proposed to place besides braking roller (21) at least one additional roller, so called friction roller (211), which is mounted on the same axle as braking roller (21) and without any contact with guiding arm (1), and said friction roller (211) comprises some rough surfaces that are in contact with said braking roller (21). When braking roller (21) is displaced and starts rotating along guiding arm (1) in the unlocked mode, said friction roller (211) is intended to be blocked, either by entering into contact with a rough part of blocking mechanism (2), the said rough part being possibly constituted by elements (29*a*) or (29*b*) fastened to blocking mechanism (2), or by entering into contact with a rough part of mobile interface unit (25), said rough part being possibly constituted by a rough surface not shown on the schematic drawings, but which may provide sufficient roughness to brake friction roller (211). This configuration ensures that a friction force appears between braking roller (21) while it is rotating along guiding arm (1), and friction roller (211) which is blocked by being in contact with elements (29*a*) or (29*b*), or otherwise blocked by being in contact with a rough part of mobile interface unit (25). It may be noticed that elements (29A) or (29*b*) may be mounted on blocking mechanism (2), through a flexible link in order to allow a free displacement of axle (22) of braking roller (21) inside oblong slots (23*a*) and (23*b*). In the realization mode presented here as an example, friction roller (211) is mounted in the central part of braking roller (21) and with the same axis, in a way that both lateral flanges of said friction roller (211) are in contact with corresponding flanges of braking roller (21). Braking roller (21) will therefore have an adapted shape, with a central zone offering an appropriate clearance. (FIG. 8). It may be observed that it is possible to reverse this configuration and design a variation where braking roller (21) is placed in the central part of friction roller (211). In addition, in the realization mode presented here as an example, the diameter of friction roller (211) is slightly bigger than the diameter of braking roller (21). In order to prevent any contact between said friction roller (211) and guiding arm (1), the cross section of said guiding arm (1) may be shaped as a U, ensuring a contact with braking roller (21) on the external parts of the track and avoiding any contact with friction roller (211) along the central part of the track. (FIG. 8)

Variation of elastic means (FIG. 10): in a preferred realization mode described here above, elastic means (26) cooperating with mobile interface unit (25), may be constituted by elastic blades (253a), (253b), (253c) and (253d), linked to mobile interface unit (25) and comprising bosses (2531a), (2531b), (2531c) and (2531d) located at their free extremity, the said bosses being located in front of notches (28a) and (28b) which are located on the faces of blocking mechanism (2), (FIGS. 5 and 2). The invention proposes to modulate the value of the load generated by elastic means (253a), (253b), (253c) and (253d), depending on the incline of blocking mechanism (2), in order to increase the hold force in locked mode, in the case the door stop device fitted on a vehicle would be inclined, the said vehicle being parked on a slope for example. In the realization mode presented here as an example, elastic means (253a), (253b), (253c) and (253d), linked to mobile interface unit (25), on the one hand, and elastic means (26Aa), (26Ab), (26Ac) and (26Ad), linked to block (26A), on the other hand, are constituted by elastic blades comprising bosses located at their free extremity, the said bosses being located in front of notches which are located on the faces of blocking mechanism (2), (FIG. 10). Block (26A) is itself mounted in a way to allow a displacement relatively to blocking mechanism (2), the said displacement being in the same direction as the displacement of mobile interface unit (25). Superior face (255) of mobile interface unit (25) is fitted with a cavity (2551) with inclined faces, the said cavity (2551) may hold a spherical ball (2552), which remains in its place by simple effect of gravity, as long as the incline of blocking mechanism (2) remains lower than the slope of the inclined faces of cavity (2551). Inferior face of block (26A) is also fitted with a cavity (26Af), placed in front of cavity (2551), in a way that when mobile interface unit (25) is displaced, face (255) of said mobile interface unit (25) may come close to face (26Ae) of block (26A), without having the spherical ball (2552), which remains in its cavity (2551), be in contact with block (26A), (FIG. 11). As a result of this pattern, when spherical ball (2552) remains located in cavity (2551) due to the effect of gravity, only the elastic means (253a), (253b), (253c) and (253d), are displaced and therefore compressed to generate a load on mobile interface unit (25), while elastic means (26Aa), (26Ab), (26Ac) and (26Ad), are not triggered and do not generate any load on the said mobile interface unit (25). On the contrary, when the inclination of the blocking mechanism (2) exceeds a given threshold which allows the spherical ball (2552) to move out of its cavity (2551), said spherical ball (2552) may roll in between faces (255) and (26Ae), then providing a mechanical link between mobile interface unit (25) and block (26A), (FIG. 12). In this case, any displacement of mobile interface unit (25) generates a displacement of block (26A) in the same direction, which leads to a compression of elastic means (26Aa), (26Ab), (26Ac) and (26Ad). In this way, the loads generated by elastic means (253a), (253b), (253c) and (253d), on the one hand, and elastic means (26Aa), (26Ab), (26Ac) and (26Ad), on the other hand, become cumulative, then providing a bigger load on mobile interface unit (25). It may be noticed that in some applications, spherical ball (2552) may be replaced by a cylinder, not described here, provided the shapes of cavities (2551) and (26Af) be adapted consequently.

The invention claimed is:

1. A door stop device, comprising:
a blocking mechanism (2); and
a guiding arm (1),
one of said blocking mechanism and guiding arm being fastened to the opening part of the door,
the other of said blocking mechanism and guiding arm being fastened to the frame of the door,
said blocking mechanism (2) comprising at least one braking element (24) pressed against at least one braking roller (21) which is kept in contact with said guiding arm (1),
an axle (22) of said braking roller (21) being allowed to move relatively to the body of said blocking mechanism (2) within specified limits, in a direction globally parallel to said guiding arm (1),
said blocking mechanism (2) also comprising elastic means (26) defined to bring said braking roller (21) and said braking element (24), back in compression against each other, wherein,
said braking element (24) is pressed against said braking roller (21), and is mounted on said blocking mechanism (2) and allowed to move in a direction globally perpendicular to said guiding arm (1);
a mobile interface unit (25) mounted on said blocking mechanism (2) and allowed to move in a direction globally perpendicular to said guiding arm (1), comprises bearing means constituted by inclined ramps having plural different slopes, which cooperate with said axle (22) of said braking roller (21) in order to transfer to said axle (22) the forces generated by the elastic means (26), when said axle (22) is moving along the said inclined ramps having the plural different slopes;
said braking element (24) is displaced by movement of said mobile interface unit (25) by means of a mechanical link allowing said braking element (24) to follow the movement of said mobile interface unit (25), during the displacement of said mobile interface unit (25);
said braking element (24) is also subjected to the load of elastic means, which are intended to bring said braking element (24) back in the locked position, in contact with said braking roller (21).

2. The door stop device as described in claim 1, wherein said bearing means of said mobile interface unit (25), are constituted by notches and/or bosses, the shapes of said notches and/or bosses comprise ramps with variable slopes, which are directly or indirectly in contact with said axle (22) of said braking roller (21).

3. The door stop device as described in claim 2, wherein said elastic means (26), which cooperate with mobile interface unit (25), are constituted by elastic blades (253a), (253b), (253c) and (253d), linked to said mobile interface unit (25) and comprising bosses (2531a, 2531b, 2531c, 2531d) located at their free extremity, said bosses being located in front of further notches (28a), said further notches (28a) being located on faces of said blocking mechanism (2).

4. The door stop device as described in claim 1, wherein said braking roller (21) is placed beside at least friction roller (211), which is mounted on the same axis as said braking roller (21), without any contact with said guiding arm (1), and said friction roller (211) comprises rough surfaces in contact with said braking roller (21).

5. The door stop device as described in claim 4, wherein during the linear displacement of said axle (22) of said braking roller (21), which said braking roller (21) rotates in unlocked mode, friction roller (211) is blocked by being in contact with a rough part of said blocking mechanism (2) or a rough part of said mobile interface unit (25).

6. The door stop device as described in claim 1, wherein said elastic means (26) are realized by adding the loads generated by at least two distinct elastic means, the loads of which are cumulated in the same direction, by the means of a spherical ball (2552) which may roll in between two parts of said distinct elastic means, which parts are located in front of each other, this being due to an incline of blocking mechanism (2) exceeding a predefined threshold; below said predefined inclination threshold, said spherical ball (2552) remains, by the effect of gravity, located in a cavity (2551) designed with inclined faces, and in this case, said spherical ball (2552) does not roll in between the two parts located in front of each other of said distinct elastic means, and the loads of said elastic means are not cumulated.

7. The door stop device as described in claim 1, wherein said door stop device is mounted on the door of a motor vehicle.

8. The door stop device as described in claim 1, wherein said door stop device is mounted on the door of a building.

9. The door stop device as described in claim 1, wherein said door stop device is mounted on the door of a household appliance.

10. The door stop device as described in claim 1, wherein,
said braking roller (21) is placed beside at least one friction roller (211), which comprises rough surfaces in contact with said braking roller (21),
said friction roller (211) is mounted on the same axis as said braking roller (21), without any contact with said guiding arm (1), and
said friction roller (211) is blocked in rotation by being in contact with a rough part of said blocking mechanism (2), or a rough part of said mobile interface unit (25), whenever a linear displacement of said axle (22) of said braking roller (21) appears, said braking roller (21) then being in rotation in unlocked mode.

* * * * *